(12) United States Patent
Sucic et al.

(10) Patent No.: US 7,047,596 B2
(45) Date of Patent: May 23, 2006

(54) STRUCTURAL BUSHING APPLICATION FOR HIGHLY LOADED COMPOSITES LUGS

(75) Inventors: Steve Sucic, Southport, CT (US); David N. Schmaling, Southbury, CT (US)

(73) Assignee: Sikorsky Aircraft Corp., Stratford, CT (US)

( * ) Notice: Subject to any disclaimer, the term of this patent is extended or adjusted under 35 U.S.C. 154(b) by 86 days.

(21) Appl. No.: 10/731,323

(22) Filed: Dec. 9, 2003

(65) Prior Publication Data

US 2005/0125946 A1    Jun. 16, 2005

(51) Int. Cl.
*F16L 5/00* (2006.01)
*H02G 3/22* (2006.01)
*E05D 7/12* (2006.01)

(52) U.S. Cl. .......................... 16/2.1; 16/273
(58) Field of Classification Search ............. 16/2.1, 16/2.5, 273; 24/457, 458; 403/150, 149, 403/157; 411/339, 901; 29/282, 280, 446, 29/523; 174/70 R, 72 R, 74 R, 77 R
See application file for complete search history.

(56) References Cited

U.S. PATENT DOCUMENTS

| | | | | |
|---|---|---|---|---|
| 3,584,857 A | * | 6/1971 | Hipsher | 267/281 |
| 3,678,535 A | * | 7/1972 | Charles | 16/2.1 |
| 3,725,973 A | * | 4/1973 | Gwozdz | 16/273 |
| 3,909,087 A | * | 9/1975 | Cairns | 384/293 |
| 4,169,637 A | | 10/1979 | Voitas | |
| 4,353,146 A | * | 10/1982 | Brockhaus | 16/387 |
| 4,435,100 A | * | 3/1984 | Cox | 403/27 |
| 4,502,693 A | * | 3/1985 | Lesiecki et al. | 277/431 |
| 4,809,402 A | * | 3/1989 | Rainville | 16/372 |
| 4,863,329 A | * | 9/1989 | Wilson | 411/339 |
| 4,865,792 A | * | 9/1989 | Moyer | 264/249 |
| 4,866,748 A | | 9/1989 | Caraher et al. | |
| 4,977,663 A | * | 12/1990 | Hurd | 29/525.04 |
| 5,018,920 A | * | 5/1991 | Speakman | 411/43 |
| 5,069,586 A | * | 12/1991 | Casey | 411/339 |
| 5,129,253 A | * | 7/1992 | Austin et al. | 72/370.07 |
| 5,145,265 A | | 9/1992 | Flem | |
| 5,230,569 A | | 7/1993 | Sheedy | |
| 5,251,986 A | * | 10/1993 | Arena | 384/272 |
| 5,645,400 A | * | 7/1997 | Hunter et al. | 416/134 A |
| 5,782,181 A | * | 7/1998 | Rossini | 101/153 |
| 5,810,562 A | * | 9/1998 | Byrnes et al. | 416/114 |
| 5,867,906 A | * | 2/1999 | Klassen | 29/898.07 |
| 5,873,547 A | * | 2/1999 | Dunstan | 244/54 |
| 5,890,556 A | * | 4/1999 | Shearn et al. | 180/69.21 |
| 6,102,610 A | * | 8/2000 | Palusis et al. | 403/388 |
| 6,170,990 B1 | | 1/2001 | Hawkins | |
| 6,402,502 B1 | | 6/2002 | Selems et al. | |
| 6,428,374 B1 | | 8/2002 | Nuss | |
| 6,474,869 B1 | * | 11/2002 | Sommerfeld et al. | 384/222 |
| 6,776,628 B1 | * | 8/2004 | Foriska et al. | 439/92 |
| 2004/0111864 A1 | * | 6/2004 | Skinner et al. | 29/523 |

FOREIGN PATENT DOCUMENTS

| | | | | |
|---|---|---|---|---|
| EP | 611149 A1 | * | 8/1994 | |
| JP | 04114928 A | * | 4/1992 | |
| JP | 2001248671 A | * | 9/2001 | |
| JP | 2003083496 A | * | 3/2003 | |
| JP | 2003120738 A | * | 4/2003 | |

* cited by examiner

*Primary Examiner*—Chuck Y. Mah

(57) ABSTRACT

A composite lug assembly includes a composite lug defining a loaded side and an unloaded side and having at least one hole extending therebetween, a shoulder bushing assembly including a first side bushing having a first cylindrical portion adapted to fit in the hole and a first shoulder portion extending from the first cylindrical portion and a second side bushing having a second cylindrical portion adapted to fit within the first cylindrical portion and a second shoulder portion extending from the second cylindrical portion wherein the first side bushing is made of a different material than the second side bushing.

14 Claims, 2 Drawing Sheets

… (US 7,047,596 B2)

STRUCTURAL BUSHING APPLICATION FOR HIGHLY LOADED COMPOSITES LUGS

BACKGROUND OF THE INVENTION

The invention relates to lug assemblies and, more particularly, to a drilled hole composite lug assembly typically used in joints such as clevis type joints, for example in the main rotor cuff of a helicopter.

Drilled hole composite lugs are commonly used in clevis type joints, where a load is transferred from one member to another by a bolt or pin. It may be desirable to bush theses composite lugs to provide protection against damage to the laminated lug structure which might occur during bolt installation and/or removal, or due to normal wear due to high bearing pressures and small relative movements of the mating parts.

Thick-walled bushings are often used to repair mis-located holes in expensive composite parts. These bushings can be installed in an oversized, mis-located hole and then drilled in the correct location.

In lugs for joints where loads are transmitted in a direction parallel to the bolt axis, it is frequently desirable to incorporate shoulder bushings which can provide protection for the faces of the lug. Shoulders can be bonded in instances where the lug bearing stress does not exceed 24,000+/−4,000 psi which is the typical adhesive bearing allowable stress.

This allowable stress applies to both loading parallel to the bolt axis (T) and loading perpendicular to the bolt axis (P). For the loading parallel to the bolt axis, the bearing stress is T/A, where A is the contact area between the bushing shoulder and the composite part. For loading perpendicular to the bolt axis, the bearing stress is P/Dt, where D is the diameter of the bushing "shank", and t is the thickness of the composite laminate. The bearing stresses due to loading parallel to the bolt axis are always compressive, and a stress level above the allowable will produce breakdown of the adhesive bond. For loading perpendicular to the bolt axis, bearing stresses are compressive in the loaded direction, and tensile on the unloaded side of the bushing. When the bearing stress is exceeded, breakdown of the bond on the loaded side of the bushing will occur. An additional failure mode which often occurs is a tensile failure on the unloaded side of the bushing. This mode has a much lower allowable. Composite bushings with relatively low modulus (i.e. +/−45 degree fiber orientation) are relatively compliant, and are able to deform with the loaded hole, with reduced tension stresses.

Composite components having composite drilled hole lugs, for example graphite laminated composites, are designed for bearing stresses which are up to 24,000+/−15,000 psi, which therefore render these components outside of the useful operating parameters of a normally bonded shoulder bushing. In order to reduce the bearing stress, the composite lugs would need to be increased in diameter and thickness to reduce the bearing stresses by nearly a factor of 4 and for many applications this results in an undesirable weight penalty.

With the foregoing in mind, it is the primary object of the present invention to provide a composite lug assembly including a structural bushing application which is well adapted to highly loaded composite lugs.

It is a further object of the present invention to provide such a lug assembly including a shoulder bushing which avoids the foregoing problems.

Other objects and advantages of the present invention will appear herein below.

SUMMARY OF THE INVENTION

In accordance with the present invention, the foregoing objects and advantages have been readily attained.

According to the invention, a composite lug assembly is provided which comprises a composite lug defining a loaded side and an unloaded side and having at least one hole extending therebetween; and a shoulder bushing assembly comprising a first side bushing having a first cylindrical portion adapted to fit in said hole and a first shoulder portion extending from said first cylindrical portion; and a second side bushing having a second cylindrical portion adapted to fit within said first cylindrical portion and a second shoulder portion extending from said second cylindrical portion; wherein said first side bushing is made of a different material than said second side bushing.

In further accordance with the invention, a shoulder bushing assembly has been provided which comprises a first side bushing having a first cylindrical portion adapted to fit in a lug and a first shoulder portion extending from said first cylindrical portion; and a second side bushing having a second cylindrical portion adapted to fit within said first cylindrical portion and a second shoulder portion extending from said second cylindrical portion; wherein said first side bushing is made of a different material than said second side bushing.

BRIEF DESCRIPTION OF THE DRAWINGS

A detailed description of preferred embodiments of the present invention follows, with reference to the attached drawings, wherein.

DETAILED DESCRIPTION OF THE DRAWINGS

The invention relates to composite lug assemblies and a shoulder bushing incorporated into same which are advantageously useful in highly loaded composite lugs, for example in joints of a main rotor of a helicopter and the like.

Figure 1:
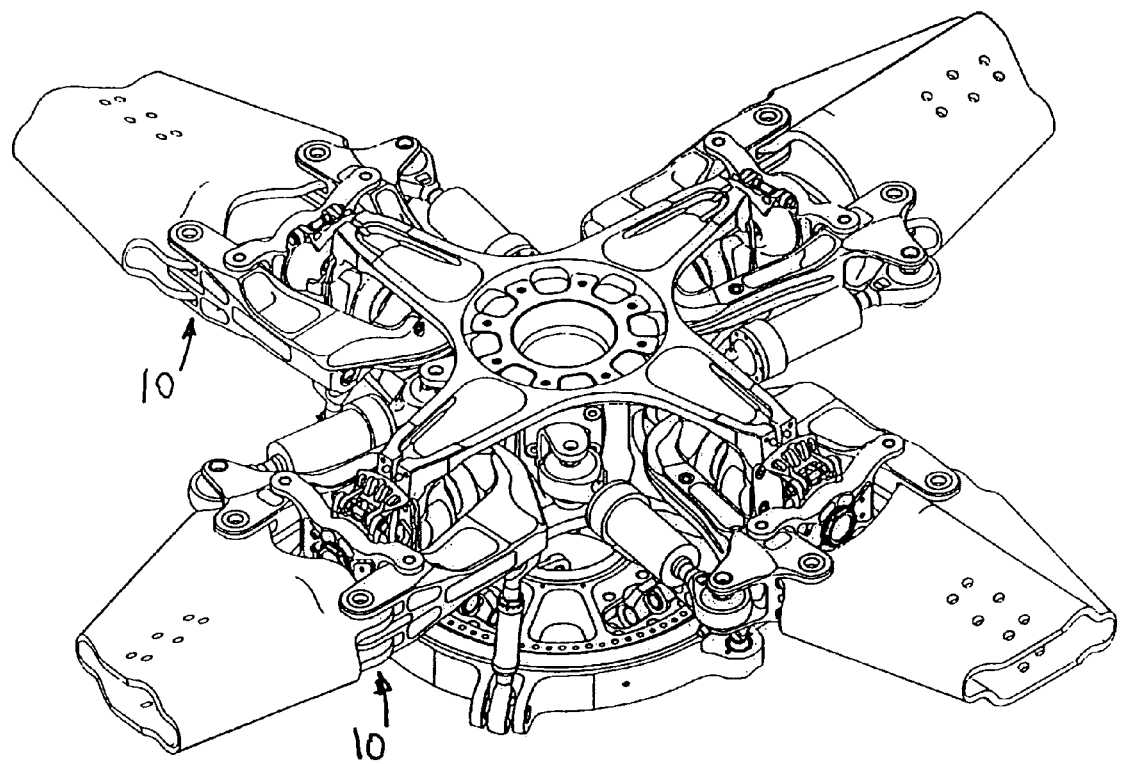
FIG. 1 is a perspective view of an environment of use including a joint having a composite lug assembly in accordance with the present invention.

FIG. 1 shows a portion of a main rotor head assembly of a helicopter which includes a plurality of yoke to cuff clevis joints. These joints are one particular environment of use of the present invention, since these are composite parts which are assembled using lug assemblies, and are subjected to bearing stresses which exceed those referenced above.

The lug assembly 10 of the present invention is generally indicated in FIG. 1, and is further described in connection with FIGS. 2–4 below.

Figure 2:
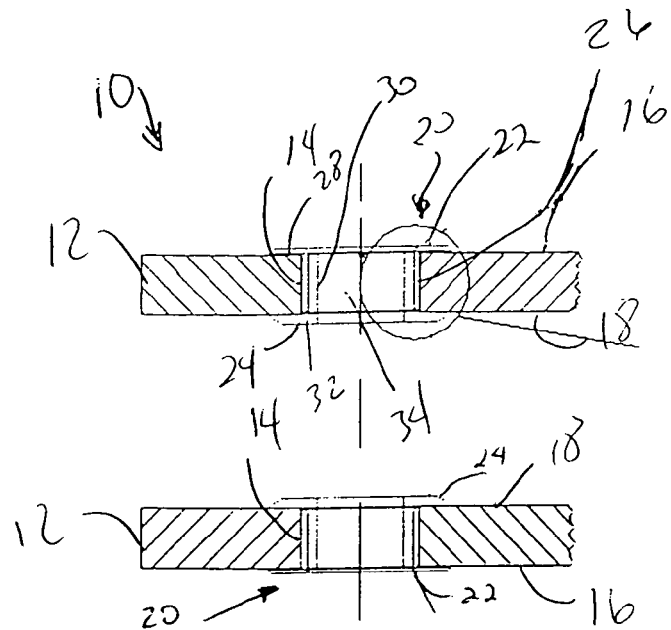
FIG. 2 is a cross section of a lug assembly in accordance with the present invention.

Turning to FIG. 2, lug assembly 10 typically includes lugs 12 having holes 14 drilled or otherwise positioned therein. Lugs 12 have an unloaded side 16 and a loaded side 18, and hole 14 is used for positioning of a pin which secures the lug to the main rotor yoke.

Figure 4:
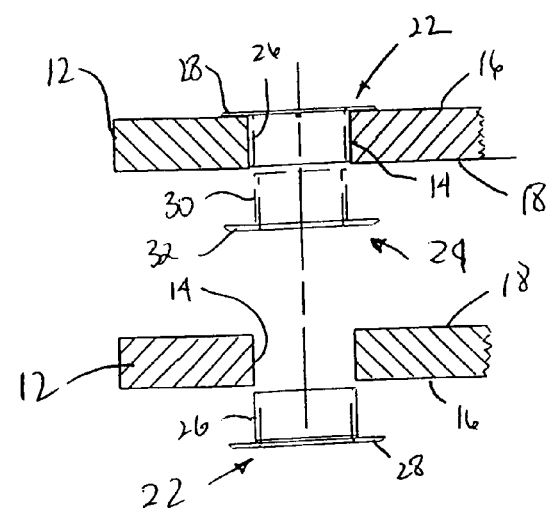
FIG. 4 illustrates assembly of the shoulder bushing in accordance with the present invention.
Figure 3:
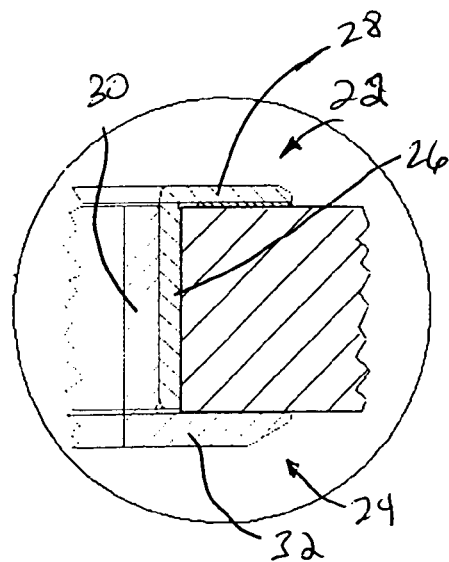
FIG. 3 is an enlarged view of a portion of FIG. 2.

Lugs 12 are typically a composite material, preferably a graphite laminated composite material, and such materials must be protected in an assembly such as that shown in FIG. 2–4 from damage of the pin positioned in holes 14.

To this end, a bushing 20 is advantageously positioned within holes 14 as is further described below.

According to the invention, bushing 20 is a shoulder bushing which advantageously serves to protect lugs 12 from loads applied to the inside surface of holes 14, and also to protect the face of the lugs 12.

Shoulder bushing 20 advantageously includes two components of different materials. These components are an unloaded-side bushing 22 and a loaded side bushing 24.

Unloaded side bushing 22 preferably has a substantially cylindrical portion 26 and a shoulder or flange portion 28 which extends outwardly from cylindrical portion 26 as shown, for example in FIGS. 2–4. This unloaded side shoulder bushing 22 is advantageously sized and adapted to be positioned within holes 14 of lugs 12.

Loaded side bushing 24 also advantageously preferably has a substantially cylindrical portion 30 and a flange or shoulder portion 32 extending therefrom. Cylindrical portion 30 is advantageously adapted to fit, preferably press fit, within cylindrical portion 26 of unloaded side bushing 22. This advantageously serves to press fit the unloaded side bushing 22 together with loaded side bushing 24 as will be further discussed below.

Unloaded side bushing 22 is preferably installed loose in hole 14. Subsequent press-fit installation of second bushing 24 into the first bushing 22 advantageously results in a line-to-line or press fit between first bushing 22 and hole 14.

Substantially cylindrical portion 30 of loaded side bushing 24 is advantageously provided having substantially thick walls to allow for drilling of a hole 34 therethrough which is the properly-positioned hole for connection with a pin as described above.

In the embodiment shown in FIG. 2, it should be noted that the unloaded sides 16 are on opposites sides of each lug 12 which is illustrated, with the loaded sides being the internal-facing surfaces of these lugs 12.

In accordance with the invention, and advantageously, unloaded side bushing 22 is provided of a different material from loaded side bushing 24.

Unloaded side bushing 22 is advantageously provided of a material having a low enough modulus as compared to the composite in which it is positioned to achieve a good fit/press. The material for this bushing is also advantageously a galvanically compatible material with the lug and also the other bushing. This bushing 22 should have a modulus less than 20 $e^6$ psi and, below that limit, preferably as low as possible. One particularly preferred material for this bushing is titanium, which is galvanically compatible, has a suitable modulus ($16e^6$) and is also advantageous due to its low weight. Of course, other metallics having suitable galvanic compatibility and modulus can be used.

Loaded side bushing 24 is advantageously provided of a material which is sized to provide a good force fit of the cylindrical portion of the unloaded side bushing 22 within the lug. The material is also preferably one which is relatively ductile and softer than the material from which the pin or bolt to be disposed in the lug is made or at least sufficiently soft to minimize bolt chafing. Suitable materials for this bushing include bronze-nickel-aluminum alloy, beryllium-copper alloy and combinations thereof. Of these materials, bronze-nickel-aluminum alloy is particularly preferred. For a steel bolt, modulus of $30e^6$, bushing 24 should have a modulus of less than $20e^6$ to ensure that there will be minimal or no fretting or chafing of the bolt.

In accordance with the present invention, unloaded side bushing 22 is advantageously bonded to prevent the bushing assembly from rotating during final machining of hole 34. Preferably, the bond should be located at the contact point between flange or shoulder portion 28 and the surface of unloaded side 16. Due to the press-fit and sleeve like interaction between bushing 22 and bushing 24, stresses along the axis of the bushing are not transmitted to unloaded side bushing 22, and therefore the bond between unloaded side bushing 22 and surface 16 is not destroyed.

FIG. 4 illustrates the general steps for assembly of the bushing of the present invention. As shown, assembly can advantageously be started with positioning of unloaded side bushing 22 into hole 14 with a suitable bonding agent positioned along the underside of flange 28 as discussed. The bonding agent may for example be room temperature curing paste adhesive such as Hysol EA9309.3NA, Magnabond 6380 and the like.

After positioning of unloaded side bushing 22, loaded side bushing 24 is advantageously press-fit into unloaded side bushing 22, as shown in the upper portion of FIG. 4, so as to complete positioning of the bushing 20 in accordance with the present invention. Bushing 20 as set forth above is advantageously sized to provide at least line-to-line or press-fit assembly within the lug.

As noted above, the inner or loaded side bushing 24 is advantageously thick-walled to allow final machining of the hole 34 to be positioned therein.

Also, assuming line-to-line resultant fit between unloaded side bushing 22 and the composite lug, the bonded shoulder of unloaded side bushing 22 will advantageously prevent rotation of the bushing pair during machining or service.

The assembly as described above can advantageously be utilized in the composite main rotor cuff, for example of a helicopter. The cuff itself is fabricated, for example using graphite epoxy prepreg material. The titanium bushing flange can be bonded to such a cuff at room temperature using a suitable paste adhesive. The cuff transmits main rotor blade centrifugal forces, bending moments, and shear loads to the main rotor yoke, typically using four clevis joint type arrangements as shown in FIG. 1. The lugs of such of an arrangement are highly loaded and the assembly of the present invention allows excellent bonding of the unloaded-side bushing, and suitable protection for the pin and surfaces of the composite lugs, while providing a desirably light weight of the assembly.

It is apparent that there has been provided in accordance with the present invention a structural bushing application for highly loaded composite lugs which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

The invention claimed is:

1. A composite lug assembly, comprising:
    a composite lug defining a loaded side and an unloaded side and having at least one hole extending therebetween; and
    a shoulder bushing assembly comprising:
        a first side bushing having a first cylindrical portion adapted to fit in said hole and a first shoulder portion extending from said first cylindrical portion; and a second side bushing having a second cylindrical portion adapted to fit within said first cylindrical portion and a second shoulder portion extending from said second cylindrical portion;

wherein said first side bushing is made of a different material than said second side bushing, wherein said first shoulder portion extends radially outwardly from said first cylindrical portion over said unloaded side, and wherein said second shoulder portion extends radially outwardly from said second cylindrical portion over said loaded side.

2. The assembly of claim 1, wherein said first side bushing is made of titanium.

3. The assembly of claim 1, wherein said second side bushing is made of a material which is softer than said first side bushing.

4. The assembly of claim 1, wherein said lug is a graphite laminated composite lug.

5. The assembly of claim 1, wherein said second side bushing has a bushing hole passing through said second cylindrical portion, and further comprising a pin disposed in said bushing hole, wherein said second side bushing is provided of a material which is softer than said pin.

6. A composite lug assembly, comprising:
a composite lug defining a loaded side and an unloaded side and having at least one hole extending therebetween; and
a shoulder bushing assembly comprising:
a first side bushing having a first cylindrical portion adapted to fit in said hole and a first shoulder portion extending from said first cylindrical portion; and
a second side bushing having a second cylindrical portion adapted to fit within said first cylindrical portion and a second shoulder portion extending from said second cylindrical portion;
wherein said first side bushing is made of a different material than said second side bushing, wherein said first shoulder portion extends over said unloaded side and is bonded thereto.

7. A composite lug assembly, comprising:
a composite lug defining a loaded side and an unloaded side and having at least one hole extending therebetween; and
a shoulder bushing assembly comprising:
a first side bushing having a first cylindrical portion adapted to fit in said hole and a first shoulder portion extending from said first cylindrical portion; and
a second side bushing having a second cylindrical portion adapted to fit within said first cylindrical portion and a second shoulder portion extending from said second cylindrical portion;
wherein said first side bushing is made of a different material than said second side bushing, wherein said second side bushing is made of a material selected from the group consisting of bronze-nickel-aluminum alloy, beryllium copper alloy and combinations thereof.

8. The assembly of claim 7, wherein said first shoulder portion extends over said unloaded side.

9. The assembly of claim 7, wherein said second shoulder portion extends over said loaded side.

10. A shoulder bushing assembly, comprising:
a first side bushing having a first cylindrical portion adapted to fit in a lug and a first shoulder portion extending from said first cylindrical portion; and
a second side bushing having a second cylindrical portion adapted to fit within said first cylindrical portion and a second shoulder portion extending from said second cylindrical portion; wherein said first side bushing is made of a different material than said second side bushing, and wherein at least one of said first shoulder portion and said second shoulder portion extends radially outwardly from said first cylindrical portion or said second cylindrical portion respectively, wherein said first shoulder portion has a radially extending portion which extends radially outwardly from said first cylindrical portion, and wherein said second shoulder portion has a radially extending portion which extends radially outwardly from said second cylindrical portion, and wherein said radially extending portions define a space therebetween.

11. The assembly of claim 10, wherein said first side bushing is made of titanium.

12. A shoulder bushing assembly, comprising:
a first side bushing having a first cylindrical portion adapted to fit in a lug and a first shoulder portion extending from said first cylindrical portion; and
a second side bushing having a second cylindrical portion adapted to fit within said first cylindrical portion and a second shoulder portion extending from said second cylindrical portion; wherein said first side bushing is made of a different material than said second side bushing, wherein said second side bushing is made of a material selected from the group consisting of bronze-nickel-aluminum alloy, beryllium copper alloy and combinations thereof.

13. The assembly of claim 10, wherein said second side bushing is made of a material which is softer than said first side bushing.

14. The assembly of claim 10, wherein said first cylindrical portion has a substantially smooth outer wall and a substantially smooth inner wall, and wherein said second cylindrical portion has a substantially smooth outer wall and is sized for press fit between said substantially smooth outer wall of said second cylindrical portion and said substantially smooth inner all of said first cylindrical portion.

* * * * *